United States Patent
Yamaguchi

(10) Patent No.: US 10,848,024 B2
(45) Date of Patent: Nov. 24, 2020

(54) STATOR FOR ROTARY ELECTRIC MACHINE AND METHOD OF MANUFACTURING THE SAME

(71) Applicant: Honda Motor Co., Ltd., Tokyo (JP)

(72) Inventor: Tadashi Yamaguchi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 423 days.

(21) Appl. No.: 15/730,746

(22) Filed: Oct. 12, 2017

(65) Prior Publication Data

US 2018/0109156 A1 Apr. 19, 2018

(30) Foreign Application Priority Data

Oct. 14, 2016 (JP) ................ 2016-202650

(51) Int. Cl.
*H02K 3/28* (2006.01)
*H02K 15/10* (2006.01)
(Continued)

(52) U.S. Cl.
CPC ........... *H02K 3/28* (2013.01); *H02K 1/16* (2013.01); *H02K 1/165* (2013.01); *H02K 3/12* (2013.01);
(Continued)

(58) Field of Classification Search
CPC .. H02K 3/28; H02K 3/18; H02K 3/12; H02K 3/345; H02K 3/48; H02K 1/16;
(Continued)

(56) References Cited

U.S. PATENT DOCUMENTS

| 4,559,698 | A | * | 12/1985 | Bair | ................. | H02K 15/12 |
| | | | | | | 29/596 |
| 2008/0246354 | A1 | * | 10/2008 | Asao | ................. | H02K 3/345 |
| | | | | | | 310/45 |

(Continued)

FOREIGN PATENT DOCUMENTS

| CN | 202550810 | 11/2012 |
| DE | 102014223205 | 5/2016 |

(Continued)

OTHER PUBLICATIONS

"Office Action of Japan Counterpart Application," with machine English translation thereof, dated Jan. 28, 2020 p. 1-p. 4.
(Continued)

*Primary Examiner* — Emily P Pham
(74) *Attorney, Agent, or Firm* — JCIPRNET

(57) ABSTRACT

Provided is a stator for a rotary electric machine capable of fixing a stator core and a coil while preventing internal contamination of the rotary electric machine. A stator (5) for a rotary electric machine includes a stator core (11) having teeth (21) and slots (23) alternately in a circumferential direction, a coil (13) mounted on the stator core (11), and an insulating layer (35) and a foamed adhesive layer (37) disposed between an inner circumferential surface of the slot (23) and the coil (13). The formed adhesive layer (37) is disposed such that an end portion of at least one side thereof in an axial direction of the stator core (11) is disposed further inside than an end surface (11*a*) of a side of the stator core (11) in the axial direction.

9 Claims, 4 Drawing Sheets

(51) Int. Cl.
| | |
|---|---|
| *H02K 3/34* | (2006.01) |
| *H02K 1/16* | (2006.01) |
| *H02K 3/12* | (2006.01) |
| *H02K 3/18* | (2006.01) |
| *H02K 3/48* | (2006.01) |
| *H02K 15/02* | (2006.01) |
| *H02K 15/00* | (2006.01) |

(52) U.S. Cl.
CPC ............... *H02K 3/18* (2013.01); *H02K 3/345* (2013.01); *H02K 3/48* (2013.01); *H02K 15/02* (2013.01); *H02K 15/10* (2013.01); *H02K 15/0056* (2013.01); *H02K 15/0081* (2013.01); *H02K 2203/09* (2013.01)

(58) Field of Classification Search
CPC ........ H02K 1/165; H02K 15/02; H02K 15/10; H02K 15/0056; H02K 15/0081; H02K 2203/09
See application file for complete search history.

(56) References Cited

U.S. PATENT DOCUMENTS

2009/0167101 A1* 7/2009 Saga ...................... H02K 3/522
310/45
2016/0380521 A1* 12/2016 Tsuchiya ................ H02K 1/165
310/215

FOREIGN PATENT DOCUMENTS

| | | |
|---|---|---|
| JP | 2008-022674 | 1/2008 |
| JP | 2009148093 | 7/2009 |
| JP | 2012147564 | 8/2012 |
| JP | 2013-009499 | 1/2013 |
| JP | 2016-052226 | 4/2016 |
| JP | 2016048989 | 4/2016 |
| WO | 2016163514 | 10/2016 |

OTHER PUBLICATIONS

"Office Action of Japan Counterpart Application," with English translation thereof, dated Oct. 23, 2019, p. 1-p. 12.
"Office Action of China Counterpart Application," with English translation thereof, dated Sep. 20, 2019, p. 1-p. 15.
"Office Action of Japan Counterpart Application," dated Feb. 6, 2018, with partial English translation thereof, p. 1-p. 4, in which the listed references were cited.
Office Action of Japan Counterpart Application, with English translation thereof, dated Mar. 25, 2019, pp. 1-4.
Office Action of China Counterpart Application, with English translation thereof, dated Mar. 22, 2019, pp. 1-13.
Office Action of China Counterpart Application, with English translation thereof, dated Mar. 2, 2020, pp. 1-7.

* cited by examiner

STATOR FOR ROTARY ELECTRIC MACHINE AND METHOD OF MANUFACTURING THE SAME

CROSS-REFERENCE TO RELATED APPLICATION

This application claims the priority benefit of Japan application serial no. 2016-202650, filed on Oct. 14, 2016. The entirety of the above-mentioned patent application is hereby incorporated by reference herein and made a part of this specification.

BACKGROUND OF THE INVENTION

Field of the Invention

The present invention relates to a stator for a rotary electric machine and a method of manufacturing the same.

Description of Related Art

In the related art, a rotary electric machine including a stator and a rotor is known. Teeth extending in a radial direction of the stator are formed on a stator core of the stator. Slots through which a coil can be inserted are formed between neighboring teeth in a circumferential direction of the stator. For example, an insulating layer configured to insulate the stator core and the coil and constituted by insulating paper is disposed between an inner circumferential surface of the slots and the coil.

In order to fix the stator core to the coil, an adhesive layer or the like is formed on front and rear surfaces of the insulating layer. For example, Patent Document 1 discloses a configuration in which a foamed adhesion section is formed on a portion of insulating paper corresponding to both end portions of the slots in an axial direction, and the foamed adhesion section fixes a coil winding to the stator core by adhesion using expansion and stickiness generated through heating after assembly of the insulating paper and the coil winding on the stator core.

PRIOR ART DOCUMENT

Patent Documents

[Patent Document 1] Japanese Unexamined Patent Application Publication No. 2016-52226

SUMMARY OF THE INVENTION

However, in the related art, the foamed adhesion section may swell and protrude from the slots in the axial direction. When the foamed adhesion section protrudes from the slots, the foamed adhesion section may peel off due to contact or the like with a refrigerant flow, and the inside of the rotary electric machine may become contaminated. Accordingly, in the related art, there is room for improvement in terms of fixing the stator core to the coil while preventing internal contamination of the rotary electric machine.

Here, the present invention has an objective of providing a stator for a rotary electric machine in which a stator core is able to be fixed to a coil while preventing internal contamination of the rotary electric machine, and a method of manufacturing the same.

A stator (for example, a stator (5, 105) in an embodiment) for a rotary electric machine (for example, a rotary electric machine (1) in the embodiment) of the present invention includes a stator core (for example, a stator core (11) in the embodiment) having teeth (for example, teeth (21) in the embodiment) and slots (for example, slots (23) in the embodiment) alternately in a circumferential direction; a coil (for example, a coil (13) in the embodiment) mounted on the stator core; and an insulating layer (for example, an insulating layer (35) in the embodiment) and an adhesive layer (for example, a foamed adhesive layer (37, 137) in the embodiment) disposed between an inner circumferential surface of the slot and the coil, wherein the adhesive layer is disposed such that an end portion of at least one side of the adhesive layer in an axial direction of the stator core is disposed further inside than an end surface (for example, an end surface (11a) in the embodiment) of a side of the stator core in the axial direction.

According to the present invention, protrusion of the adhesive layer from the slot at one side in the axial direction can be prevented. For this reason, for example, a refrigerant flowing along one end surface of the stator core in the axial direction can suppress a contact with the adhesive layer and peeling off of the adhesive layer. Accordingly, the stator core and the coil can be fixed while preventing internal contamination of the rotary electric machine.

In the stator for the rotary electric machine, the adhesive layer may be disposed such that end portions of both sides of the adhesive layer in the axial direction are disposed further inside than end surfaces of both sides of the stator core in the axial direction.

According to the present invention, protrusion of the adhesive layer from the slot at both sides in the axial direction can be prevented. For this reason, for example, a refrigerant flowing along both end surfaces of the stator core in the axial direction can suppress a contact with the adhesive layer and peeling off of the adhesive layer. Accordingly, the stator core and the coil can be fixed while preventing internal contamination of the rotary electric machine.

In the stator for the rotary electric machine, the insulating layer may be insulating paper, and the adhesive layer may be formed of a foaming adhesive agent (for example, a foaming adhesive agent (39) in the embodiment) applied on a central section of the insulating paper in the axial direction.

According to the present invention, the insulating layer and the adhesive layer can be formed using the insulating paper on which the forming adhesive agent is applied. Here, since the forming adhesive agent is applied on the central section of the insulating paper in the axial direction, protrusion of the adhesive layer formed of the forming adhesive agent from the slot can be suppressed. Accordingly, the stator for the rotary electric machine can be easily formed.

In the stator for the rotary electric machine, the adhesive layer may be disposed not to protrude from the slot in the axial direction while being formed by heating.

According to the present invention, in the configuration in which the adhesive layer is formed by heating and forming, protrusion of the adhesive layer from the slot can be prevented.

A method of manufacturing a stator for a rotary electric machine of the present invention is a method of manufacturing a stator (for example, a stator (5, 105) in an embodiment) for a rotary electric machine (for example, a rotary electric machine (1) in the embodiment) including a stator core (for example, a stator core (11) in the embodiment) having teeth (for example, teeth (21) in the embodiment) and slots (for example, slots (23) in the embodiment) alternately in a circumferential direction; a coil (for example, a coil (13)

in the embodiment) mounted on the stator core; and an insulating layer (for example, an insulating layer (35) in the embodiment) and an adhesive layer (for example, a foamed adhesive layer (37, 137) in the embodiment) disposed between an inner circumferential surface of the slot and the coil, wherein the stator core and the coil are fixed by disposing the adhesive layer on only a central section of the insulating layer in an axial direction of the stator core.

According to the present invention, since the adhesive layer is disposed on only the central section of the insulating layer in the axial direction, protrusion of the adhesive layer from the slot at both sides in the axial direction can be prevented. For this reason, for example, a refrigerant flowing along both end surfaces of the stator core in the axial direction can suppress a contact with the adhesive layer and peeling off of the adhesive layer. Accordingly, the stator core and the coil can be fixed while preventing internal contamination of the rotary electric machine.

According to the present invention, protrusion of the adhesive layer from the slot at one side in the axial direction can be prevented. For this reason, for example, a refrigerant flowing along one end surface of the stator core in the axial direction can suppress a contact with the adhesive layer and peeling off of the adhesive layer. Accordingly, the stator core and the coil can be fixed while preventing internal contamination of the rotary electric machine.

DESCRIPTION OF THE EMBODIMENTS

Hereinafter, an embodiment of the present invention will be described with reference to the accompanying drawings.

Embodiment

First, a rotary electric machine 1 of an embodiment will be described.

Figure 1:
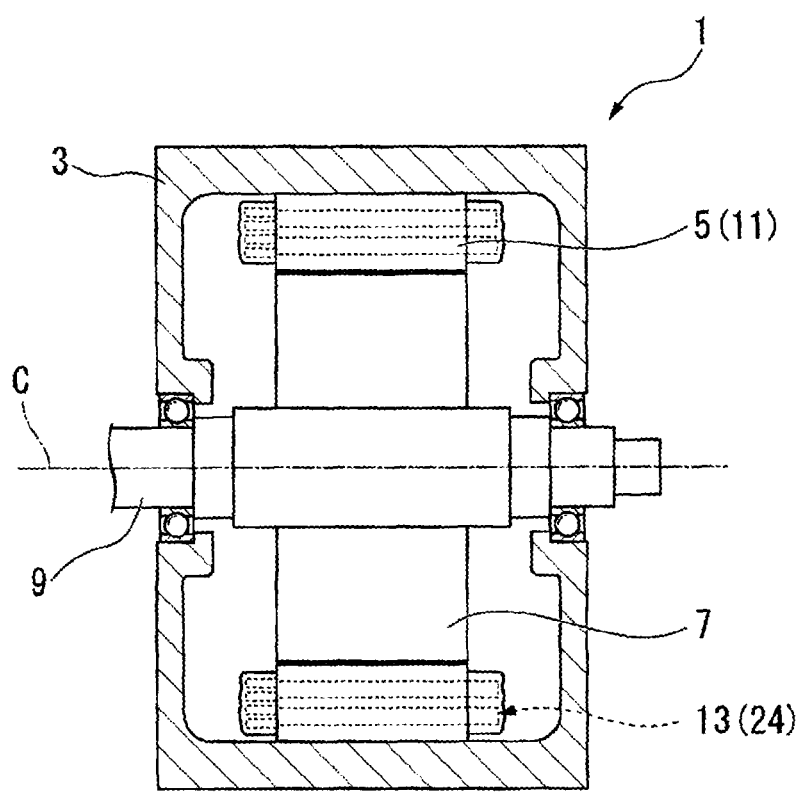
FIG. 1 is a cross-sectional view showing a configuration of a rotary electric machine according to an embodiment as a whole.

FIG. 1 is a schematic configuration view (a cross-sectional view) showing the rotary electric machine according to the embodiment as a whole.

As shown in FIG. 1, the rotary electric machine 1 is a traveling motor mounted on a vehicle such as a hybrid automobile or an electric automobile. However, a configuration of the present invention is not limited to a traveling motor and may also be applied to a power generating motor or a motor for another use, or a rotary electric machine (including a generator) other than one used in a vehicle.

The rotary electric machine 1 includes a case 3, a stator 5, a rotor 7, an output shaft 9, and a refrigerant supply system (not shown).

The refrigerant supply system supplies a refrigerant to the stator 5, the rotor 7, or the like. An example of the refrigerant is a working fluid used for lubrication, power transmission, and so on, for example, in an automatic transmission (AT). The rotary electric machine 1 is used in a state in which a portion of the stator 5 is submerged in the refrigerant.

The output shaft 9 is rotatably supported in the case 3.

The rotor 7 is formed in a tubular shape fitted onto the output shaft 9. Further, in the following description, a direction along an axis C of the output shaft 9 is simply referred to as an axial direction, a direction perpendicular to the axis C is referred to as a radial direction, and a direction around the axis C is referred to as a circumferential direction.

Figure 2:
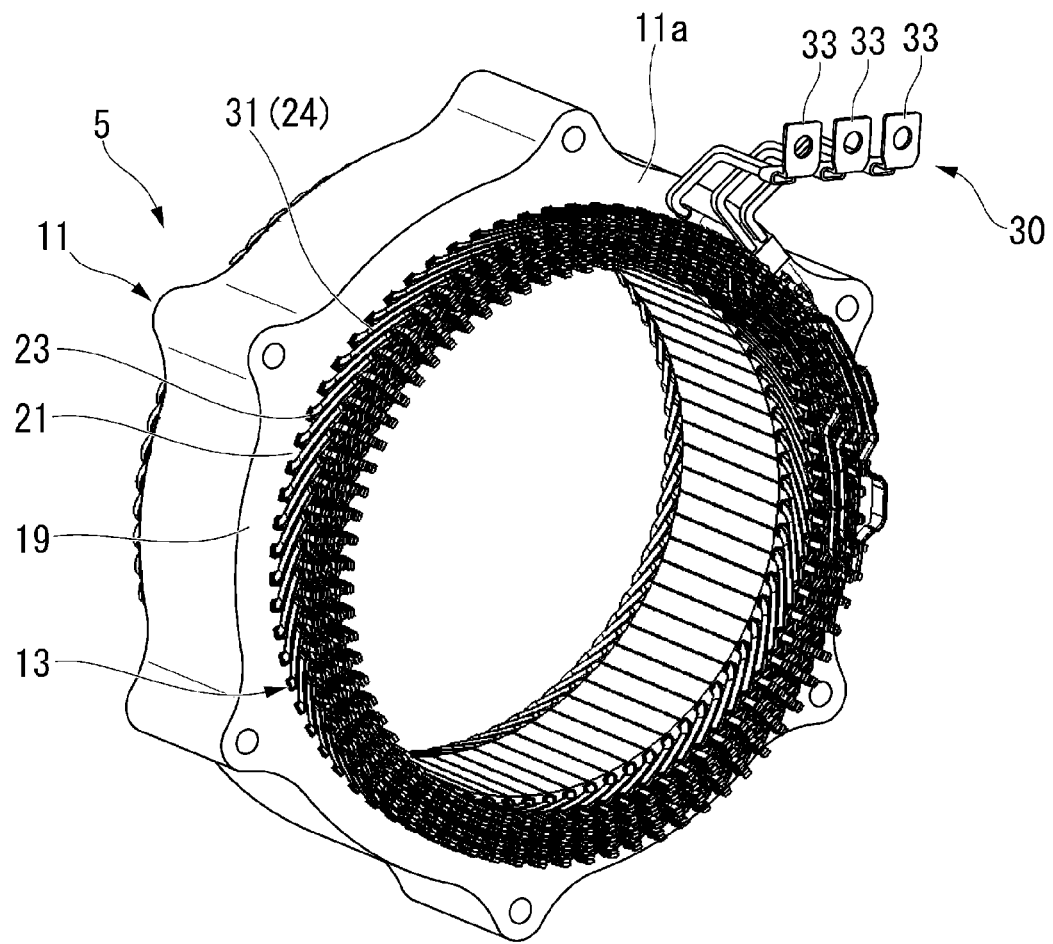
FIG. 2 is a perspective view showing a stator according to the embodiment.

FIG. 2 is a perspective view showing the stator according to the embodiment.

As shown in FIG. 2, the stator 5 includes a stator core 11 and coils 13 mounted on the stator core 11.

The stator core 11 is formed in a tubular shape that surrounds the rotor 7 (see FIG. 1) from the outside in the radial direction. Specifically, the stator core 11 includes a cylindrical back yoke 19, and a plurality of teeth 21 protruding inward from an inner circumferential surface of the back yoke 19 in the radial direction. The back yoke 19 is fixed to the inner circumferential surface of the above-mentioned case 3 (see FIG. 1) by fitting together or the like. Groove-shaped slots 23 are formed between neighboring teeth 21 of the stator core 11 in the circumferential direction. That is, the teeth 21 and the slots 23 are alternately disposed in the circumferential direction of the stator core 11.

The coils 13 are 3-phase coils constituted by a U phase, a V phase and a W phase. The coils 13 are formed by a coil-shaped conducting wire 30. The coil-shaped conducting wire 30 is inserted into the slots 23 to form the coils 13. The coil-shaped conducting wire 30 includes a plurality of rectangular wires 31 having end portions extending outside of the slots 23.

In the embodiment, the rectangular wires 31 form a segment coil 24. The coils 13 having the phases of the embodiment are formed by connecting a plurality of corresponding segment coils 24 to each other. The segment coils 24 are mounted on the stator core 11 and inserted into the slots 23 of the stator core 11. Among the plurality of segment coils 24, the segment coils 24 having the same phase that form a middle portion other than the end portions of the coils 13 of respective phases are joined to each other in the axial direction on the stator core 11 through TIG welding, laser welding, or the like. Among the plurality of segment coils 24, the end portions which are the 6 (3 phases×2) segment coils 24 (the rectangular wires 31) that form the end portions of the coils 13 having respective phases are pulled out to be longer than the end portions of the other segment coils 24.

Three terminals 33 are installed on the coil-shaped conducting wire 30. The two rectangular wires 31 connected to the terminals 33 are, for example, rectangular wires 31 having the same phase. Accordingly, an external power supply (not shown) and the coils 13 having respective phases are electrically connected to the terminals 33. Power is supplied to the coils 13 from the external power supply through the terminals 33.

Figure 3:
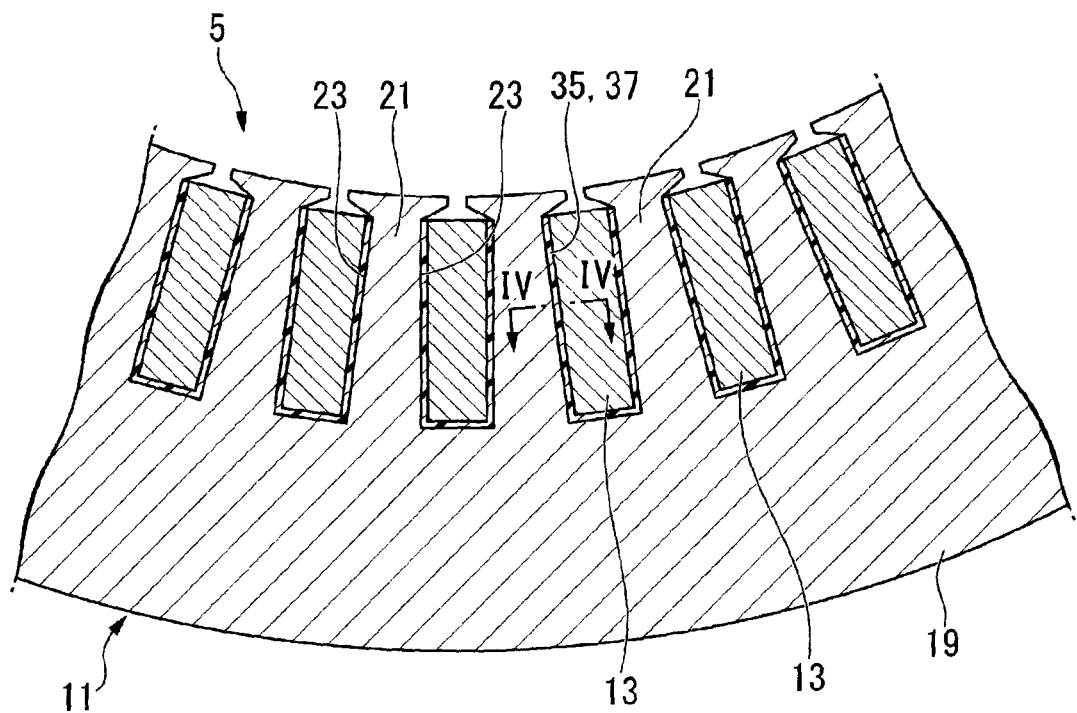
FIG. 3 is a partially enlarged cross-sectional view showing a portion of the stator according to the embodiment.
Figure 4:
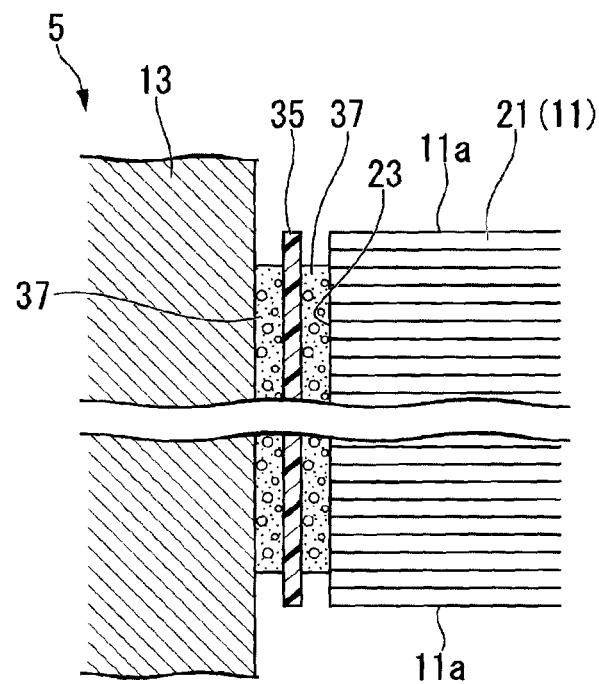
FIG. 4 is a cross-sectional view taken along line IV-IV of FIG. 3.

FIG. 3 is a partially enlarged cross-sectional view of the stator according to the embodiment when seen in the axial direction. FIG. 4 is a cross-sectional view taken along line IV-IV of FIG. 3. Further, the coils 13 shown in FIG. 3 are shown such that the 3-phase coils are integrated, by omitting detailed illustration of the 3-phase (a U phase, a V phase and a W phase) coils. In addition, in FIG. 3, an insulating layer 35 and formed adhesive layers 37 (adhesive layers), which will be described below, are collectively illustrated as one layer.

As shown in FIGS. 3 and 4, the insulating layer 35 and the foamed adhesive layers 37 are disposed between the inner circumferential surfaces of the slots 23 and the coils 13. The insulating layer 35 is insulating paper formed of a resin material having an insulation property such as polyphenylene sulfide resin or the like. The insulating layer 35 is formed by bending or curving belt-shaped insulating paper along the inner circumferential surface of the slot 23. Positions of both end portions of the insulating layer 35 in the axial direction substantially coincide with positions of both of the end surfaces 11a of the stator core 11 in the axial direction, respectively. The insulating layer 35 is disposed between surfaces directed to both sides of the coil 13 in the circumferential direction, the surface directed inward in the radial direction, and the inner circumferential surface of the slot 23.

The formed adhesive layers 37 are formed at both sides with the insulating layer 35 sandwiched therebetween. The formed adhesive layers 37 are formed by heating and forming a foaming adhesive agent 39 (see FIG. 5). The forming adhesive agent 39 is a resin material having stickiness during forming and expanding by heating. The forming adhesive agent 39 is obtained by dispersing acryl-based capsules containing liquid isopentane in a base material formed of, for example, an epoxy-based resin material. Accordingly, the forming adhesive agent 39 can form the base material when the liquid isopentane in the capsules is vaporized and expanded by heating. The formed adhesive layers 37 cause the insulating layer 35 to adhere to the coil 13 and the inner circumferential surface of the slot 23. Accordingly, the coil 13 is adhered and fixed to the inner circumferential surface of the slot 23 via the foamed adhesive layers 37 and the insulating layer 35.

Figure 5:
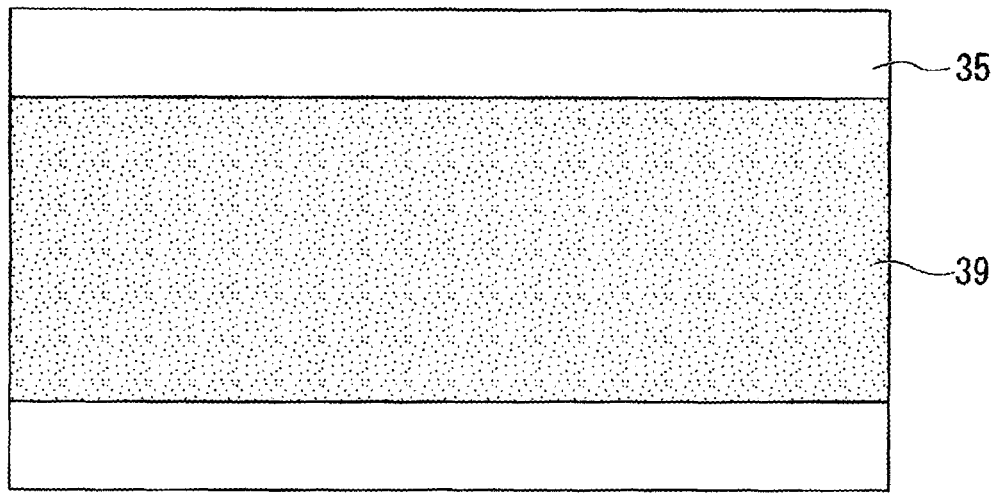
FIG. 5 is a view for describing an insulating layer and a foamed adhesive layer according to the embodiment.

FIG. 5 is a view for describing the insulating layer and the foamed adhesive layers according to the embodiment, showing a plan view of the insulating layer in a state before the forming adhesive agent is heated and formed.

The formed adhesive layer 37 is disposed such that both end portions in the axial direction are disposed further inside in the axial direction than both of end surfaces 11a of the stator core 11 in the axial direction. That is, the foamed adhesive layer 37 is disposed in the slot 23 other than in regions adjacent to both of the end surfaces 11a of the stator core 11 in the axial direction. As shown in FIG. 5, the forming adhesive agent 39 is applied and formed on central sections of front and rear surfaces of the insulating paper (the insulating layer 35) in the axial direction such that the foamed adhesive layer 37 is disposed such that both end portions in the axial direction are disposed further inside than both of the end surfaces 11a of the stator core 11 in the axial direction as shown in FIG. 4.

In this way, according to the embodiment, since the foamed adhesive layer 37 is disposed such that both end portions in the axial direction are disposed further inside than both of the end surfaces 11a of the stator core 11 in the axial direction, protrusion of the foamed adhesive layer 37 from the slot 23 at both sides in the axial direction can be prevented. For this reason, for example, the refrigerant flowing along both of the end surfaces 11a of the stator core 11 in the axial direction can suppress a contact with the foamed adhesive layer 37 and peeling off of the foamed adhesive layer 37. Accordingly, the stator core 11 and the coil 13 can be fixed to each other while preventing internal contamination of the rotary electric machine 1.

In addition, the insulating layer 35 is insulating paper, and the foamed adhesive layer 37 is formed of the forming adhesive agent 39 applied to the central section of the insulating paper in the axial direction. For this reason, as the insulating paper on which the forming adhesive agent 39 is applied is used, the insulating layer 35 and the foamed adhesive layer 37 can be formed. Here, since the forming adhesive agent 39 is applied to the central section of the insulating paper in the axial direction, protrusion of the foamed adhesive layer 37 formed of the forming adhesive agent 39 from the slot 23 can be suppressed. Accordingly, the stator 5 for the rotary electric machine 1 exhibiting the above-mentioned effects can be easily formed.

In addition, the foamed adhesive layer 37 is disposed not to protrude from the slot 23 in the axial direction while being formed by heating. For this reason, in the configuration in which the foamed adhesive layer 37 is formed by heating and forming, protrusion of the foamed adhesive layer 37 from the slot 23 can be prevented. Accordingly, internal contamination of the rotary electric machine 1 can be prevented.

Variant of Embodiment

Next, a stator 105 for a rotary electric machine of a variant of the embodiment will be described.

Figure 6:
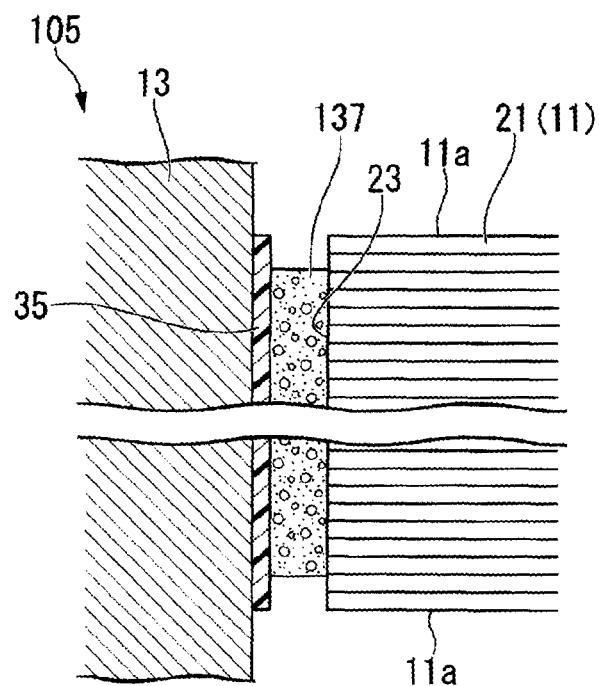
FIG. 6 is a view for describing a stator according to a variant of the embodiment, showing a cross-sectional view of a portion corresponding to line IV-IV of FIG. 3.

FIG. 6 is a view for describing the stator according to the variant of the embodiment, showing a cross-sectional view of a portion corresponding to line IV-IV of FIG. 3.

In the embodiment shown in FIG. 4, the foamed adhesive layers 37 are formed at both sides with the insulating layer 35 sandwiched therebetween. On the other hand, the variant of the embodiment shown in FIG. 6 is distinguished from the embodiment in that a foamed adhesive layer 137 (an adhesive layer) is formed at one side of the insulating layer 35. Further, components the same as in the embodiment shown in FIGS. 1 to 5 are designated by the same reference numbers and detailed description thereof will be omitted.

As shown in FIG. 6, the insulating layer 35 and the foamed adhesive layer 137 are disposed between the inner circumferential surface of each of the slots 23 and the coil 13.

The formed adhesive layer 137 is formed on a surface side of the insulating layer 35 facing the inner circumferential surface of the slot 23. The formed adhesive layer 137 is formed by heating and forming the forming adhesive agent like in the embodiment. The formed adhesive layer 137 causes the insulating layer 35 to adhere to the inner circumferential surface of the slot 23. The formed adhesive layer 137 is disposed such that both end portions in the axial direction are disposed further inside than both of the end surfaces 11a of the stator core 11 in the axial direction like the foamed adhesive layer 37 of the embodiment.

The insulating layer 35 is pressed against the coil 13 by the foamed adhesive layer 137, which is formed and expanded, and is in pressure contact with the coil 13. The insulating layer 35 and the coil 13 are fixed by the pressing force, and the coil 13 is fixed to the inner circumferential surface of the slot 23 via the foamed adhesive layer 137 and the insulating layer 35. Further, fixing of the insulating layer 35 to the coil 13 is not limited to fixing due to a pressing force from the foamed adhesive layer 137 and, for example, may be fixing using an adhesive property of an outer sheath of the coil 13, fixing by forming another adhesive layer between the insulating layer 35 and the coil 13, or the like.

In this way, according to the variant, since the foamed adhesive layer 137 is formed at only one side of the insulating layer 35, in comparison with the case in which the foamed adhesive layers are disposed on the front and rear surfaces of the insulating layer, an application amount of the forming adhesive agent can be reduced. Accordingly, the stator 105 for the rotary electric machine can be manufactured at low cost.

Further, in the variant, while the foamed adhesive layer 137 is formed on the surface of the insulating layer 35 corresponding to the inner circumferential surface of the slot 23, there is no limitation thereto. The formed adhesive layer may be formed on the surface of the insulating layer facing the coil 13. In this case, a configuration in which the coil 13 and the insulating layer 35 are fixed by applying and forming the forming adhesive agent on the surface of the coil 13 may be provided.

Further, the present invention is not limited to the embodiment described with reference to the accompanying drawings, and various variants may be conceived without departing from the spirit of the present invention.

For example, in the embodiment and the variant thereof, while the foamed adhesive layer 37 or 137 is disposed at a position further inside than both of the end surfaces 11a of the stator core 11 in the axial direction, there is no limitation thereto. For example, when the refrigerant in the rotary electric machine mainly flows along one end surface of the stator core 11 in the axial direction, the foamed adhesive layer may be disposed at a position further inside than at least one end surface of the stator core 11 in the axial direction. Accordingly, peeling off of the foamed adhesive layer due to contact with the flowing refrigerant can be suppressed, and the stator core and the coil can be fixed while preventing internal contamination of the rotary electric machine.

In addition, in the embodiment, while the adhesive layer disposed between the inner circumferential surface of each of the slots 23 and the coil 13 is the foamed adhesive layer 37 formed of the forming adhesive agent 39, there is no limitation thereto and the adhesive layer may be an adhesive layer formed of an adhesive agent having no formability.

In addition, while the coil 13 of the embodiment is mounted on the stator core 11 through distributed winding, there is no limitation to this configuration and the coil 13 may be mounted on the stator core 11 through concentrated winding.

In addition, the components of the above-mentioned embodiment may be appropriately substituted with known components without departing from the spirit of the present invention.

What is claimed is:

1. A stator for a rotary electric machine comprising:
   a stator core having teeth and slots on an inner circumferential surface of the stator core, wherein the teeth and the slots are alternately disposed in a circumferential direction;
   a coil mounted on the stator core; and
   an insulating layer and an adhesive layer disposed between an inner circumferential surface of one of the slots and the coil,
   wherein the adhesive layer is disposed such that an end portion of at least one side of the adhesive layer in an axial direction of the stator core is disposed further inside in the axial direction than an end surface of a side of the stator core in the axial direction.

2. The stator for the rotary electric machine according to claim 1, wherein the adhesive layer is disposed such that end portions of both sides of the adhesive layer in the axial direction are disposed further inside than end surfaces of both sides of the stator core in the axial direction.

3. The stator for the rotary electric machine according to claim 1, wherein the insulating layer is an insulating paper, and
   the adhesive layer is formed of a foaming adhesive agent applied on a central section of the insulating paper in the axial direction.

4. The stator for the rotary electric machine according to claim 1, wherein the adhesive layer is disposed not to protrude from the slot in the axial direction while being formed by heating.

5. A method of manufacturing a stator for a rotary electric machine, the stator comprising:
   a stator core having teeth and slots on an inner circumferential surface of the stator core, wherein the teeth and the slots are alternately disposed in a circumferential direction;
   a coil mounted on the stator core; and
   an insulating layer and an adhesive layer disposed between an inner circumferential surface of one of the slots and the coil,
   wherein the stator core and the coil are fixed by disposing the adhesive layer on only a central section of the insulating layer in an axial direction of the stator core.

6. The stator for the rotary electric machine according to claim 2, wherein the insulating layer is an insulating paper, and
   the adhesive layer is formed of a foaming adhesive agent applied on a central section of the insulating paper the axial direction.

7. The stator for the rotary electric machine according to claim 2, wherein the adhesive layer is disposed not to protrude from the slot in the axial direction while being formed by heating.

8. The stator for the rotary electric machine according to claim 3, wherein the adhesive layer is disposed not to protrude from the slot in the axial direction while being formed by heating.

9. The stator for the rotary electric machine according to claim 6, wherein the adhesive layer is disposed not to protrude from the slot in the axial direction while being formed by heating.

* * * * *